US010907526B1

(12) United States Patent
Nason

(10) Patent No.: US 10,907,526 B1
(45) Date of Patent: Feb. 2, 2021

(54) EXHAUST PIPE REPAIR SYSTEM

(71) Applicant: Mark Nason, Saranac Lake, NY (US)

(72) Inventor: Mark Nason, Saranac Lake, NY (US)

( * ) Notice: Subject to any disclaimer, the term of this patent is extended or adjusted under 35 U.S.C. 154(b) by 435 days.

(21) Appl. No.: 15/912,764

(22) Filed: Mar. 6, 2018

(51) Int. Cl.
*F16L 55/18* (2006.01)
*F01N 13/08* (2010.01)
*F01N 13/18* (2010.01)

(52) U.S. Cl.
CPC ....... *F01N 13/1816* (2013.01); *F01N 13/082* (2013.01); *F01N 13/1827* (2013.01); *F16L 55/18* (2013.01); *F01N 2450/08* (2013.01)

(58) Field of Classification Search
CPC ..... F16L 21/002; F16L 21/005; F16L 21/022; F16L 55/18; F16L 55/1608; F01N 13/1816; F01N 13/1827; F01N 2450/08; F01N 13/082
USPC ...... 285/53, 54, 48, 31, 247, 15, 234, 144.1, 285/145.1, 148.22, 334.5
See application file for complete search history.

(56) References Cited

U.S. PATENT DOCUMENTS 2,185,725 A * 1/1940 Elliott ................... F16L 19/041 285/148.11
2,357,669 A * 9/1944 Lake ....................... F16L 33/26 285/222.5
2,549,741 A * 4/1951 Young ..................... F16L 19/04 285/334.5
D163,955 S 7/1951 McCartney
2,635,642 A 4/1953 Hobbs
3,124,376 A 3/1964 Stovall
3,290,067 A * 12/1966 Buckle .................... F16L 31/00 285/247
4,585,091 A 4/1986 Budd
5,961,153 A 10/1999 Foster
6,006,859 A 12/1999 Hussaini
6,318,761 B1 * 11/2001 Robertson ............. F16L 21/007 285/31
7,240,767 B2 7/2007 Nakagawa
2011/0239678 A1 * 10/2011 Yasuda ................. F25B 41/003 62/259.1

* cited by examiner

*Primary Examiner* — Aaron M Dunwoody
(74) *Attorney, Agent, or Firm* — Kyle A. Fletcher, Esq.

(57) ABSTRACT

The exhaust pipe repair system replaces the damaged portion of the pipe that has been removed from the pipe network that transports a gas. The exhaust pipe repair system creates a fluidic connection between a plurality of terminal ends in the pipe network formed where the pipe was removed. The exhaust pipe repair system includes a transport apparatus and a plurality of collars. The transport apparatus provides a replacement transport channel. The plurality of collars attach the exhaust pipe repair system to the plurality of terminal ends. The plurality of collars: 1) forms a gas impermeable seal that prevents gas from leaking out of the pipe network; and, 2) allows for the adjustment of exhaust pipe repair system to match the span between the plurality of terminal ends.

17 Claims, 4 Drawing Sheets

EXHAUST PIPE REPAIR SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of engineering in general including pipes and fittings, more specifically, a device for repairing a leak in a pipe by replacing the damaged part of the pipe.

SUMMARY OF INVENTION

The exhaust pipe repair system is a leak repair device. The exhaust pipe repair system replaces the damaged portion of a pipe used as a fluidic connection in a pipe network. The exhaust pipe repair system is configured to replace the damaged portion of the pipe after the pipe has been removed from the pipe network. The pipe network is configured to transport and process a gas. The exhaust pipe repair system creates a replacement fluidic connection between a plurality of terminal ends in the pipe network that are formed at the boundary where the damaged portion of the pipe was removed from the pipe network. The exhaust pipe repair system comprises a transport apparatus and a plurality of collars. The transport apparatus provides a replacement transport channel through which the gas transported and processed through the pipe network flows between the plurality of terminal ends. The plurality of collars attach the exhaust pipe repair system to the plurality of terminal ends. The plurality of collars: 1) forms a gas impermeable seal that prevents gas from leaking out of the pipe network; and, 2) allows for the adjustment of exhaust pipe repair system to match the span between the plurality of terminal ends. In the first potential embodiment of the disclosure, the pipe network is the exhaust system of a vehicle.

These together with additional objects, features and advantages of the exhaust pipe repair system will be readily apparent to those of ordinary skill in the art upon reading the following detailed description of the presently preferred, but nonetheless illustrative, embodiments when taken in conjunction with the accompanying drawings.

In this respect, before explaining the current embodiments of the exhaust pipe repair system in detail, it is to be understood that the exhaust pipe repair system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the exhaust pipe repair system.

It is therefore important that the claims be regarded as including such equivalent construction insofar as they do not depart from the spirit and scope of the exhaust pipe repair system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
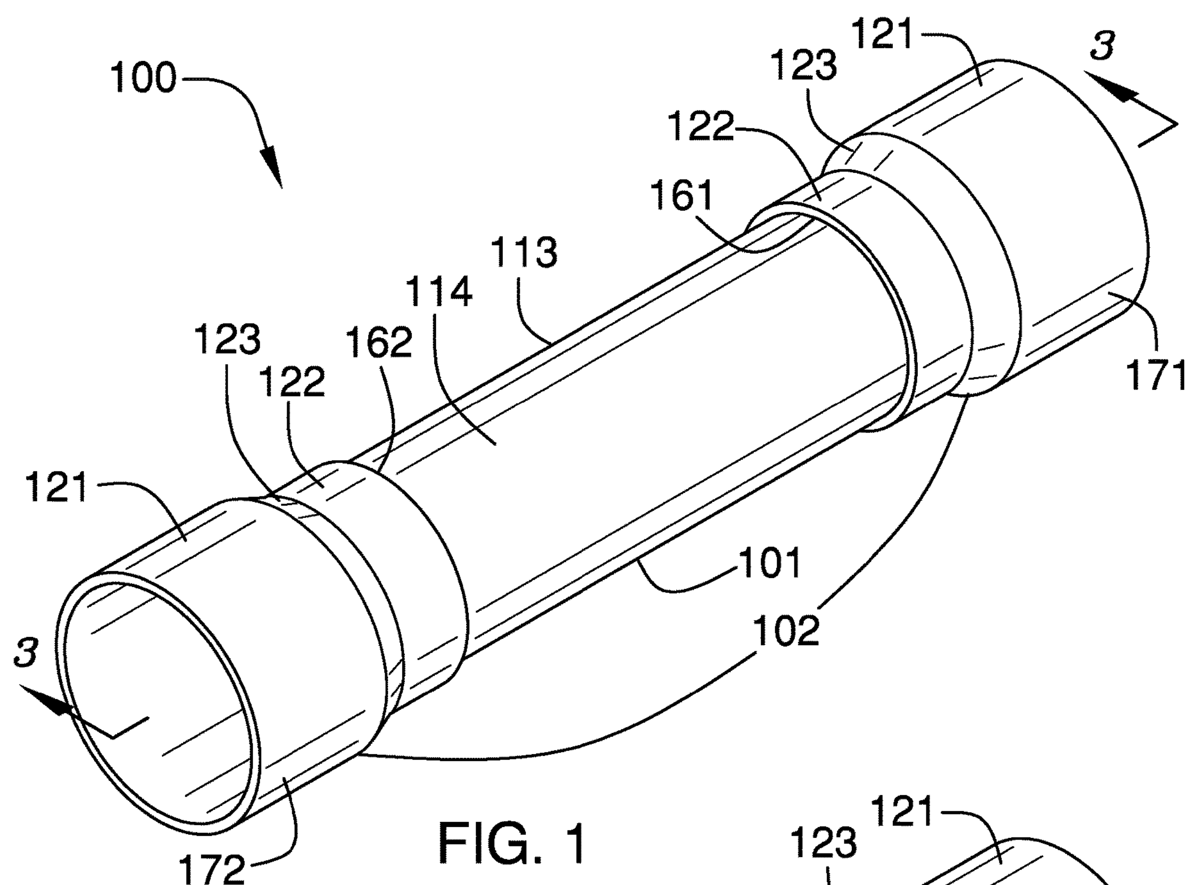
FIG. 1 is a perspective view of an embodiment of the disclosure.
Figure 2:
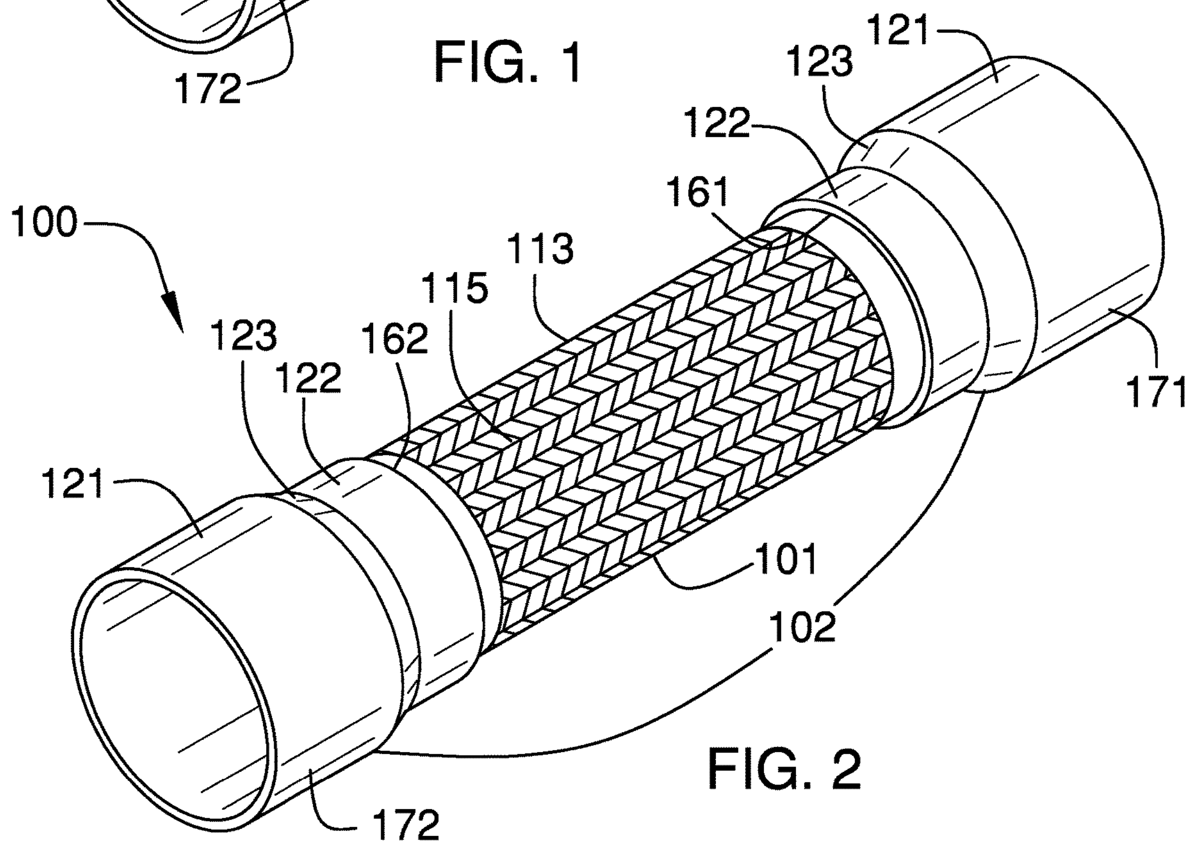
FIG. 2 is a perspective view of an alternate embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The exhaust pipe repair system 100 (hereinafter invention) is a leak repair device. The invention 100 replaces the damaged portion of a pipe used as a fluidic connection in a pipe network 191. The invention 100 is configured to replace the damaged portion of the pipe after the pipe has been removed from the pipe network 191. The pipe network 191 is configured to transport and process a gas. The invention 100 creates a replacement fluidic connection between a plurality of terminal ends 103 in the pipe network 191 that are formed at the boundary where the damaged portion of the pipe was removed from the pipe network 191. The invention 100 comprises a transport apparatus 101 and a plurality of collars 102. The transport apparatus 101 provides a replacement transport channel through which the gas transported and processed through the pipe network 191 flows between the plurality of terminal ends 103. The plurality of collars 102 attach the invention 100 to the plurality of terminal ends 103. The plurality of collars 102: 1) forms a gas impermeable seal that prevents gas from leaking out of the pipe network; and, 2) allows for the adjustment of the invention 100 to match the span between the plurality of terminal ends 103. In the first potential embodiment of the disclosure, the pipe network 191 is the exhaust system of a vehicle.

The invention 100 is configured for use with a plurality of terminal ends 103 in a pipe network 191. The pipe network 191 is configured for use in transporting a gas. The plurality of terminal ends 103 comprises a third end 163 and a fourth end 164. The third end 163 is further defined with a fifth outer diameter 145. The fourth end 164 is further defined with a sixth outer diameter 146.

The transport apparatus 101 is selected from the group consisting of a replacement pipe 114 and a replacement hose 115. The transport apparatus 101 is configured to transport a gas through the pipe network 191. The transport apparatus 101 replaces a damaged pipe within the pipe network 191. Specifically, the transport apparatus 101 replaces the damaged pipe after the damaged pipe is cut out of the pipe network 191. Cutting the damaged pipe out of the pipe network 191 creates a third end 163 and a fourth end 164 in the pipe network 191. The transport apparatus 101 replaces the damaged pipe by attaching the third end 163 and the fourth end 164 using the plurality of collars 102.

The transport apparatus 101 comprises a transport tube 113, a first flair 111, and a second flair 112. The first flair 111 is further defined with a first outer diameter 141, a second outer diameter 142, and a cone angle 181. The second flair 112 is further defined with a third outer diameter 143, a fourth outer diameter 144, and a cone angle 181. The transport tube 113 is further defined with a first end 161 and a second end 162.

The first flair 111 is a hollow structure. The first flair 111 is formed in the shape of a truncated cone. The truncated ends of the first flair 111 are open such that the gas will pass through the first flair 111. The gas flow of the pipe network 191 enters and exits the transport tube 113 through the first flair 111. The truncated end of the first flair 111 defined by the second outer diameter 142 attaches to the first end 161 of the transport tube 113. The truncated end of the first flair 111 defined by the fourth outer diameter 144 attaches to the third end 163 of the pipe network 191.

The cone angle 181 is an angle that is formed between the lateral face of the transport tube 113 and the exterior surface of the first flair 111. The second inner diameter 152 of the mounting collar 121 is greater than the fifth outer diameter 145 of the third end 163 such that the third end 163 inserts into the first flair 111. The first inner diameter 151 of the attachment cylinder 122 is sized such that the first outer diameter 141 of the first flair 111 inserts into the attachment cylinder 122.

The second flair 112 is a hollow structure. The second flair 112 is formed in the shape of a truncated cone. The truncated ends of the second flair 112 are open such that the gas will pass through the second flair 112. The gas flow of the pipe network 191 enters and exits the transport tube 113 through the second flair 112. The truncated end of the second flair 112 defined by the third inner diameter 153 attaches to the second end 162 of the transport tube 113. The truncated end of the second flair 112 defined by the fourth inner diameter 154 attaches to the fourth end 164 of the pipe network 191.

The cone angle 181 is an angle that is formed between the lateral face of the transport tube 113 and the exterior surface of the second flair 112. The cone angle 181 of the second flair 112 is identical to the cone angle 181 of the first flair 111. The fourth inner diameter 154 of the second flair 112 is greater than the sixth outer diameter 146 of the fourth end 164 such that the fourth end 164 inserts into the second flair 112. The third inner diameter 153 of the attachment cylinder 122 is sized such that the third outer diameter 143 of the second flair 112 inserts into the attachment cylinder 122.

The transport tube 113 is a hollow structure selected from the group consisting of a replacement pipe 114 and a replacement hose 115. In the first potential embodiment of the disclosure, the transport tube 113 is commercially available. The transport tube 113 forms a channel that routes gas flow through the pipe network 191 from the third end 163 to the fourth end 164.

Each of the plurality of collars 102 is a fitting that attaches the transport apparatus 101 to an end of the pipe network 191 selected from the group consisting of the third end 163 and the fourth end 164. Each of the plurality of collars 102 are identical. Each of the plurality of collars 102 slide along the transport apparatus 101 such that the span of the length of the invention 100 can be adjusted during installation. Each of the plurality of collars 102 further comprises a gas impermeable seal that inhibits the escape of gas from the pipe network 191.

Each of the plurality of collars 102 comprises a mounting collar 121, an attachment cylinder 122, a sealing frustum 123, a muffler clamp 124, and an elastomeric material 125. The mounting collar 121 is further defined with a first inner diameter 151. The attachment cylinder 122 is further defined with a second inner diameter 152. The sealing frustum 123 is further defined with a third inner diameter 153, a fourth inner diameter 154, and a cone angle 181.

The mounting collar 121 is a hollow mechanical structure. The mounting collar 121 attaches the transport apparatus 101 to the pipe network 191. The mounting collar 121 is a cylindrical pipe that slides over an end of the pipe network 191 selected from the group consisting of the third end 163 and the fourth end 164. The mounting collar 121 has a cylindrical pipe structure. The inner diameter of the mounting collar 121 equals the second inner diameter 152 of the first flair 111 such that the mounting collar 121 will fit over the selected end of the pipe network 191.

The attachment cylinder 122 is a hollow mechanical structure. The attachment cylinder 122 is a cylindrical pipe that slides over an end of the transport tube 113 of the transport apparatus 101. The attachment cylinder 122 is sized such that the attachment cylinder 122 will slide along the lateral face of the transport tube 113.

The sealing frustum 123 is a truncated cone. The sealing frustum 123 attaches the attachment cylinder 122 to the mounting collar 121. The sealing frustum 123 is an inert structure that increases the inner diameter of the transport apparatus 101 such that the transport apparatus 101 will attach to the pipe network 191.

Figure 3:
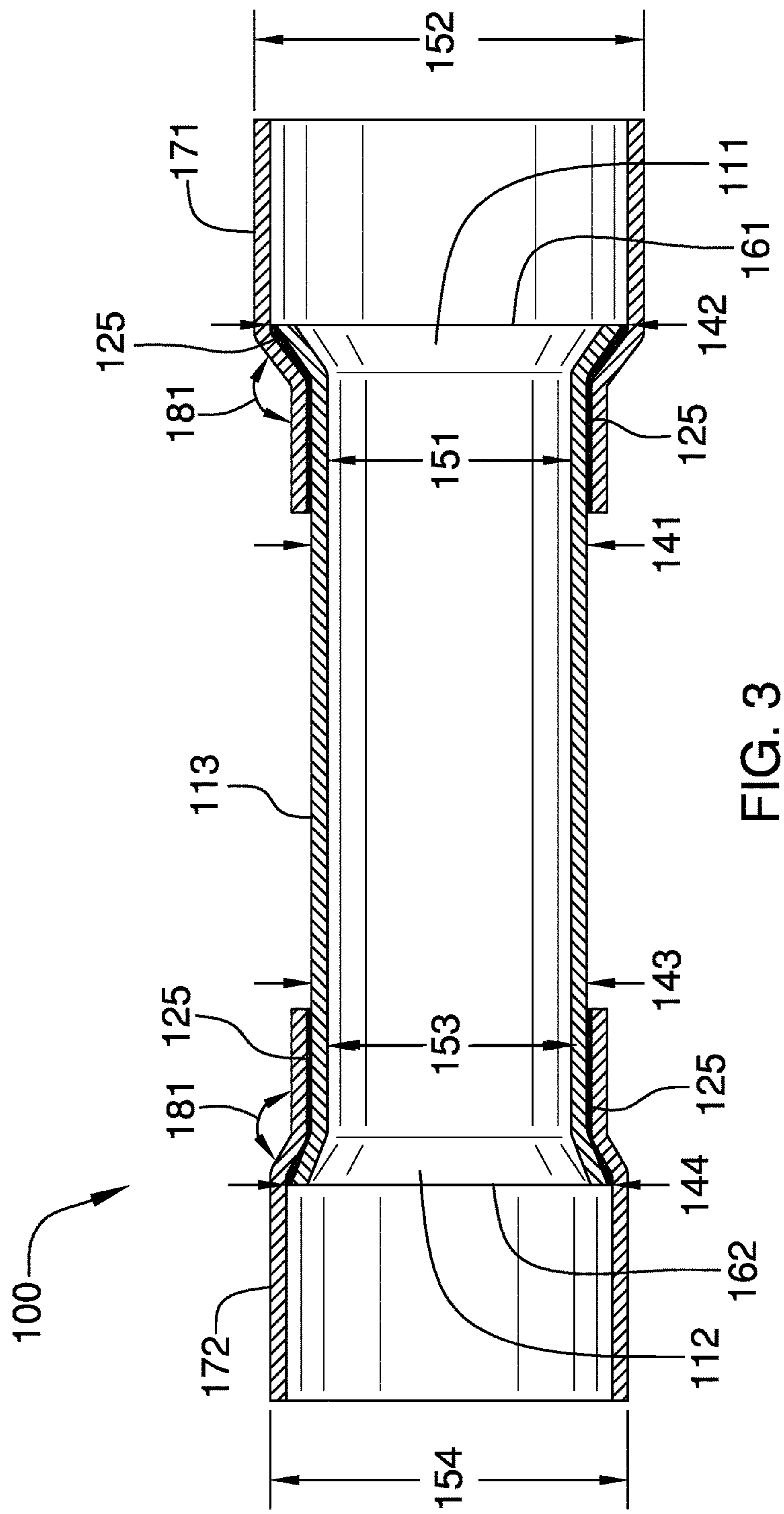
FIG. 3 is a cross-sectional view of an embodiment of the disclosure across 3-3 as shown in FIG. 1.
Figure 4:
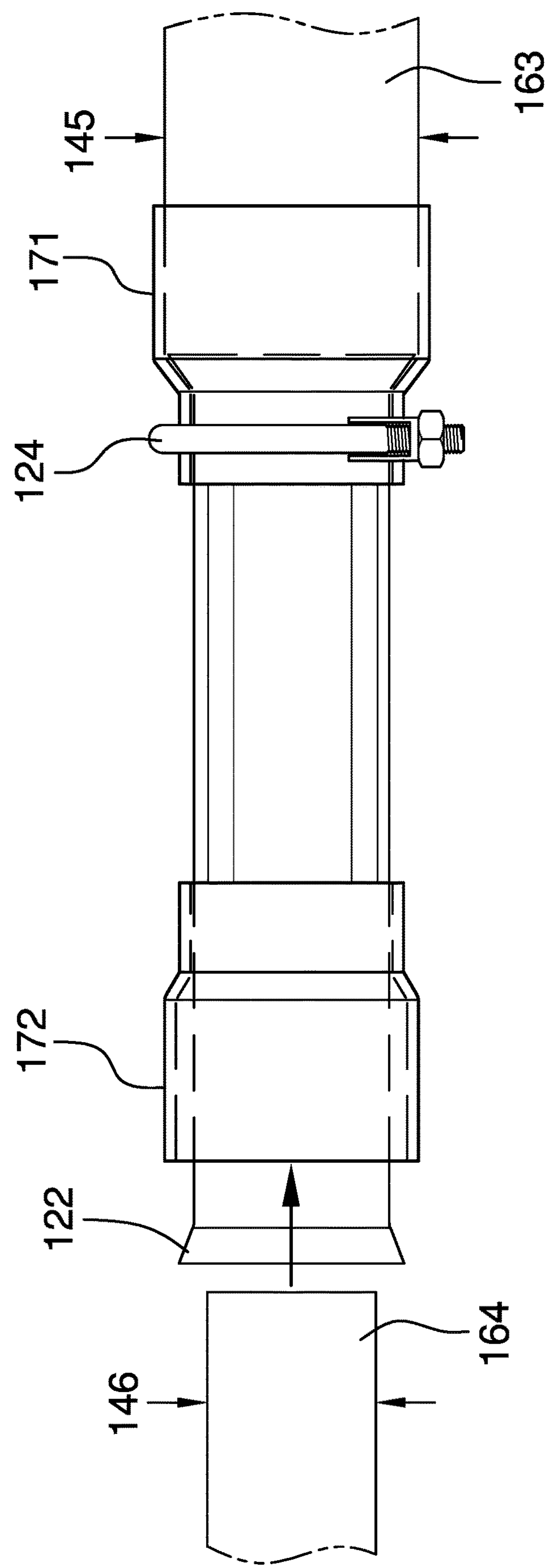
FIG. 4 is an in-use view of an embodiment of the disclosure.
Figure 5:
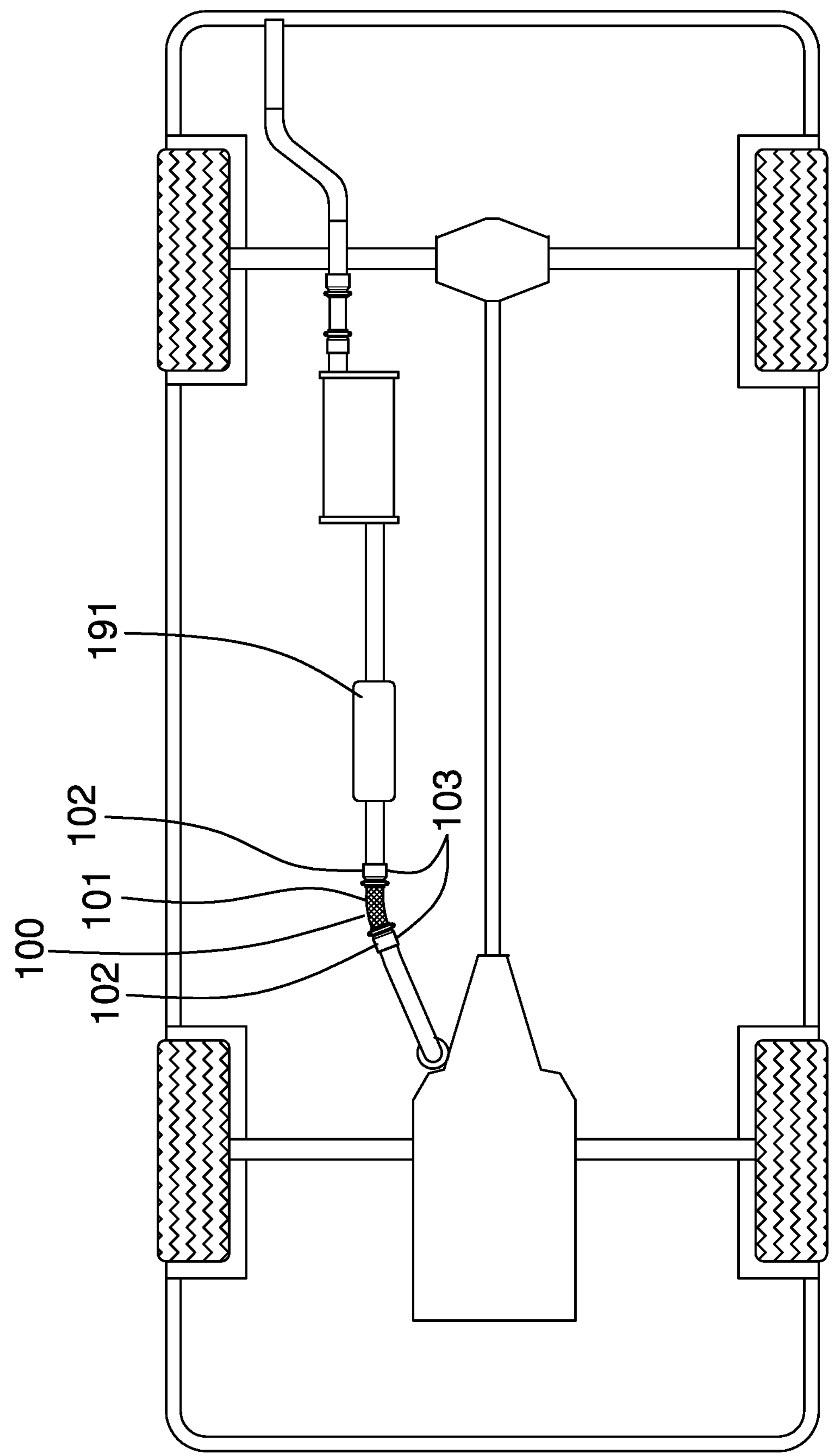
FIG. 5 is an in-use view of an embodiment of the disclosure.

As shown most clearly in FIG. 3, the sealing frustum 123 further forms a cone angle 181 between the lateral face of the attachment cylinder 122 and the exterior surface of the sealing frustum 123. The cone angle 181 of the sealing frustum 123 is identical to the cone angle 181 of the first flair 111. The cone angle 181 of the sealing frustum 123 is identical to the cone angle 181 of the second flair 112.

The muffler clamp 124 is a well-known and commercially available hardware item that attaches the selected collar to the transport tube 113.

The elastomeric material 125 is an elastomeric material that coats the interior surface of the sealing frustum 123. The elastomeric material 125 forms a gas impermeable seal when the sealing frustum 123 is pressed against a flair selected from the group consisting of the first flair 111 and the second flair 112.

The plurality of collars 102 further comprises a first collar 171 and a second collar 172.

The first collar 171 attaches to the third end 163 of the pipe network 191. The second collar 172 attaches to the fourth end 164 of the pipe network 191.

The following definitions were used in this disclosure:

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Collar: As used in this disclosure, a collar is a ring-like device placed around an object.

Cone: As used in this disclosure, a cone is a surface that is generated by rotating a triangle around one of the legs of the triangle. If a line that is perpendicular to the base that is drawn from the center of the base goes through the vertex of the triangle then the cone is called a right cone. A cone is a type of quadric surface. The cone is a pyramid with a circular base. The cone is further defined with an apex, a base, and a lateral face.

Cylinder: As used in this disclosure, a cylinder is a geometric structure defined by two identical flat and parallel ends, also commonly referred to as bases, which are circular in shape and connected with a single curved surface, referred to in this disclosure as the lateral face. The cross-section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder which is defined as a cylinder wherein the curved surface perpendicularly intersects with the two identical flat and parallel ends.

Elastic: As used in this disclosure, an elastic is a material or object that deforms when a force is applied to it and that is able to return to its relaxed shape after the force is removed. A material that exhibits these qualities is also referred to as an elastomeric material.

Fitting: As used in this disclosure, a fitting is a component that is attached to a first object. The fitting is used for forming a fluidic connection between the first object and a second object.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connection are well-known and documented in the mechanical, chemical, and plumbing arts.

Frustum: As used in this disclosure, a frustum is a portion of a solid that lies between two parallel planes that intersect with the solid.

Gas: As used in this disclosure, a gas refers to a state (phase) of matter that is fluid and that fills the volume of the structure that contains it. Stated differently, the volume of a gas always equals the volume of its container.

Hose: As used in this disclosure, a hose is a flexible hollow cylindrical device that is used for transporting liquids and gases. When referring to a hose in this disclosure, the terms inner diameter and outer diameter are used as they would be used by those skilled in the plumbing arts.

Inert Structure: As used in this disclosure, an inert structure is a physical structure that has no moving parts. An inert structure can be a component in a larger, moving structure.

Inner Diameter: As used in this disclosure, the term inner diameter is used in the same way that a plumber would refer to the inner diameter of a pipe.

Outer Diameter: As used in this disclosure, the term outer diameter is used in the same way that a plumber would refer to the outer diameter of a pipe.

Pipe: As used in this disclosure, a pipe is a hollow cylindrical device used for transporting liquids and gases. The line that connects the center of the first base of the cylinder to the center of the second base of the cylinder is referred to as the axis of the cylinder or the centerline of the pipe. When two pipes share the same centerline they are said to be aligned. In this disclosure, the terms inner diameter of a pipe and outer diameter are used as they would be used by those skilled in the plumbing arts.

Pyramid: As used in this disclosure, a pyramid is a three-dimensional shape that comprises a base formed in the shape of an N-gon (wherein N is an integer) with N triangular faces that rise from the base to meet at a point above the base. If the point where the N faces meet is positioned such that a line drawn from the point where the N faces meet to the center of the N-gon base is perpendicular to the N-gon base, the pyramid is referred to as a right pyramid. Pyramids can be further formed with circular or elliptical bases which are commonly referred to as cone or an elliptical pyramid respectively.

Truncated Cone: As used in this disclosure, a truncated cone is a frustum that remains when the apex of a cone is truncated by a plane that is parallel to the base of the cone.

Truncated Pyramid: As used in this disclosure, a truncated pyramid is a frustum that remains when the apex of a pyramid is truncated by a plane that is parallel to the base of the pyramid.

Tube: As used in this disclosure, a tube is a hollow cylindrical device used for transporting liquids and gases. The line that connects the center of the first base of the cylinder to the center of the second base of the cylinder is referred to as the center axis of the tube or the centerline of the tube. In this disclosure, the terms inner diameter of a tube and outer diameter of a tube are used as they would be used by those skilled in the plumbing arts.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A system for repairing a leak in a pipe comprising:

a transport apparatus and a plurality of collars;

wherein the system replaces the damaged portion of a pipe used as a fluidic connection in a pipe network;

wherein the pipe network is configured to transport and process a gas;

wherein the system is configured to replace the damaged portion of the pipe after the damaged pipe has been removed from the pipe network;

wherein the system creates a replacement fluidic connection between a plurality of terminal ends in the pipe network that are formed at the boundary where the damaged portion of the pipe was removed from the pipe network;

wherein the transport apparatus provides a replacement transport channel through which the gas transported and processed through the pipe network flows between the plurality of terminal ends;

wherein the plurality of collars attach to the plurality of terminal ends;

wherein the pipe network is the exhaust system of a vehicle;

wherein the plurality of collars forms a gas impermeable seal that prevents gas from leaking out of the pipe network;

wherein the plurality of collars allows for the adjustment of the system to match a span between the plurality of terminal ends;

wherein the plurality of terminal ends comprises a third end and a fourth end;

wherein cutting the damaged pipe out of the pipe network creates a third end and a fourth end in the pipe network;

wherein the third end and the fourth end attach to the plurality of collars;

wherein the third end is further defined with a fifth outer diameter;

wherein the fourth end is further defined with a sixth outer diameter;

wherein each of the plurality of collars comprises a mounting collar, an attachment cylinder, a sealing frustum, a muffler clamp, and an elastomeric material.

2. The system for repairing a leak in a pipe according to claim 1 wherein the transport apparatus replaces the damaged pipe by forming a fluidic connection between the third end and the fourth end.

3. The system for repairing a leak in a pipe according to claim 2 wherein the transport apparatus comprises a transport tube, a first flair, and a second flair;

wherein the first flair and the second flair attach to the transport tube;

wherein the first flair is further defined with a first outer diameter, a second outer diameter, and a cone angle;

wherein the second flair is further defined with a third outer diameter, a fourth outer diameter, and a cone angle;

wherein the transport tube is further defined with a first end and a second end.

4. The system for repairing a leak in a pipe according to claim 3 wherein the first flair is a hollow structure;

wherein the first flair is formed in the shape of a truncated cone;

wherein the truncated ends of the first flair are open such that the gas will pass through the first flair.

5. The system for repairing a leak in a pipe according to claim 4 wherein the truncated end of the first flair defined by the second outer diameter attaches to the first end of the transport tube;

wherein the truncated end of the first flair defined by the fourth outer diameter attaches to the third end of the pipe network.

6. The system for repairing a leak in a pipe according to claim 5 wherein the cone angle is an angle that is formed between the lateral face of the transport tube and the exterior surface of the first flair.

7. The system for repairing a leak in a pipe according to claim 6 wherein the second flair is a hollow structure;

wherein the second flair is formed in the shape of a truncated cone;

wherein the truncated ends of the second flair are open such that the gas will pass through the second flair.

8. The system for repairing a leak in a pipe according to claim 7 wherein the truncated end of the second flair defined by the third inner diameter attaches to the second end of the transport tube;

wherein the truncated end of the second flair defined by the fourth inner diameter attaches to the fourth end of the pipe network;

wherein the cone angle is an angle that is formed between the lateral face of the transport tube and the exterior surface of the second flair;

wherein the cone angle of the second flair is identical to the cone angle of the first flair.

9. The system for repairing a leak in a pipe according to claim 8 wherein the transport tube is a hollow structure selected from the group consisting of a replacement pipe and a replacement hose;

wherein the transport tube forms a channel that routes gas flow through the pipe network from the third end to the fourth end.

10. The system for repairing a leak in a pipe according to claim 9 wherein each of the plurality of collars are identical;

wherein each of the plurality of collars slides along the transport apparatus such that the span of the length of the system can be adjusted during installation;

wherein each of the plurality of collars further comprises a gas impermeable seal that inhibits the escape of gas from the pipe network.

11. The system for repairing a leak in a pipe according to claim 10 wherein the sealing frustum attaches the attachment cylinder to the mounting collar;

wherein the muffler clamp secures the selected collar to the transport tube;

wherein the elastomeric material attaches to the sealing frustum;

wherein the mounting collar is further defined with a first inner diameter;

wherein the attachment cylinder is further defined with a second inner diameter;

wherein the sealing frustum is further defined with a third inner diameter, a fourth inner diameter, and a cone angle.

12. The system for repairing a leak in a pipe according to claim 11 wherein the mounting collar attaches the transport apparatus to the pipe network;

wherein the mounting collar has a cylindrical pipe structure;

wherein the mounting collar is a cylindrical pipe that slides over an end of the pipe network selected from the group consisting of the third end and the fourth end;

wherein the inner diameter of the mounting collar equals the second inner diameter of the first flair.

13. The system for repairing a leak in a pipe according to claim 12 wherein the attachment cylinder is a hollow mechanical structure;

wherein the attachment cylinder is a cylindrical pipe.

14. The system for repairing a leak in a pipe according to claim 13 wherein the sealing frustum is a truncated cone;

wherein the sealing frustum attaches the attachment cylinder to the mounting collar;

wherein the sealing frustum is an inert structure that increases the inner diameter of the transport apparatus such that the transport apparatus will attach to the pipe network.

15. The system for repairing a leak in a pipe according to claim 14 wherein the sealing frustum further forms a cone angle between the lateral face of the attachment cylinder and the exterior surface of the sealing frustum;

wherein the cone angle of the sealing frustum is identical to the cone angle of the first flair;

wherein the cone angle of the sealing frustum is identical to the cone angle of the second flair.

16. The system for repairing a leak in a pipe according to claim 15 wherein the elastomeric material is an elastomeric material that coats the interior surface of the sealing frustum;

wherein the elastomeric material forms a gas impermeable seal when the sealing frustum is pressed against a flair selected from the group consisting of the first flair and the second flair.

17. The system for repairing a leak in a pipe according to claim 16 wherein the second inner diameter of the first flair is greater than the fifth outer diameter of the third end such that the third end inserts into the first flair;

wherein the first inner diameter of the attachment cylinder is sized such that the first outer diameter of the first flair inserts into the attachment cylinder;

wherein the fourth inner diameter of the second flair is greater than the sixth outer diameter of the fourth end such that the fourth end inserts into the second flair;

wherein the third inner diameter of the attachment cylinder is sized such that the third outer diameter of the second flair inserts into the attachment cylinder.

* * * * *